Aug. 17, 1926.
K. E. BLUM
1,596,796
ANTISKID DEVICE
Filed Jan. 27, 1926  2 Sheets-Sheet 1
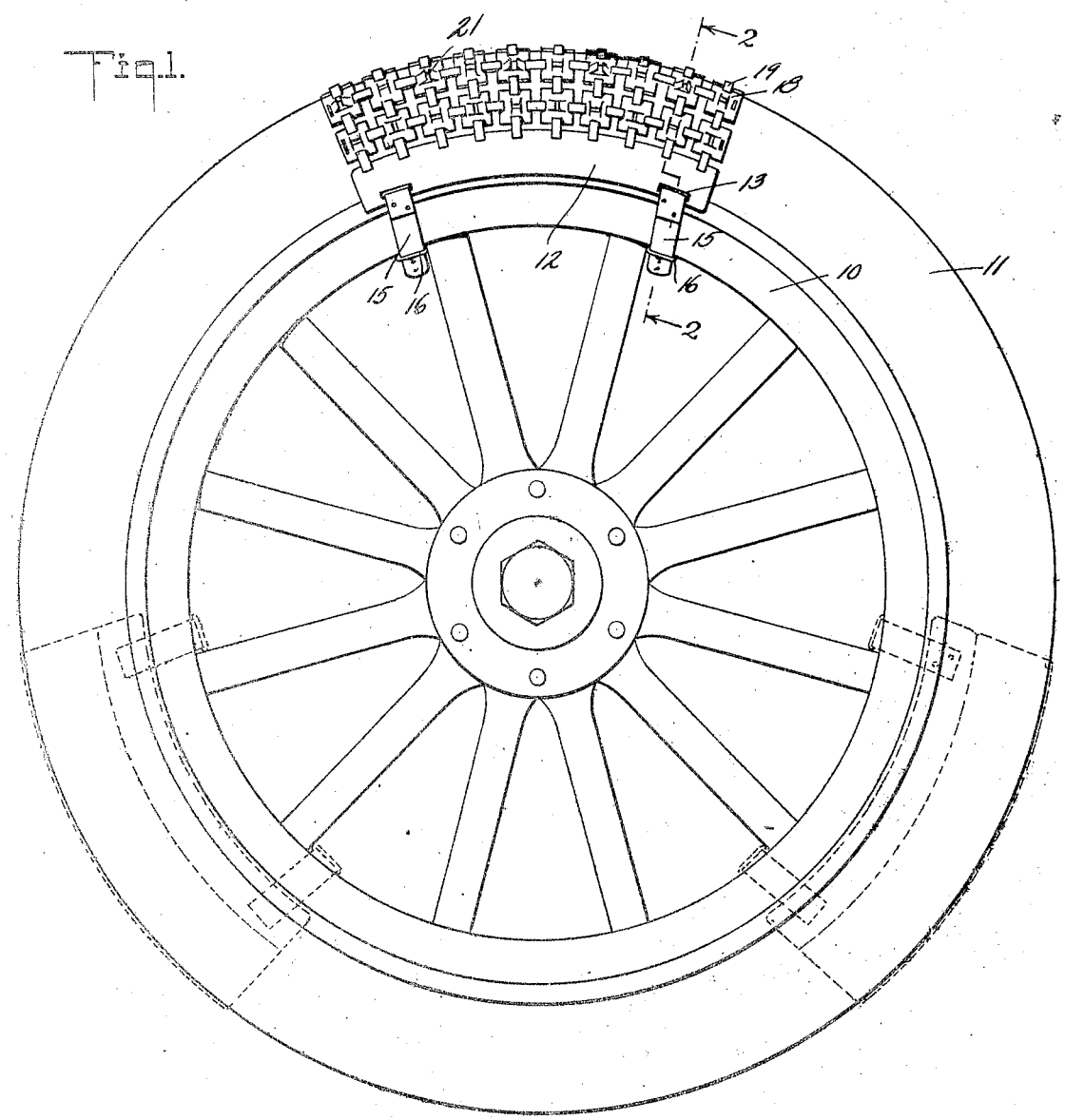
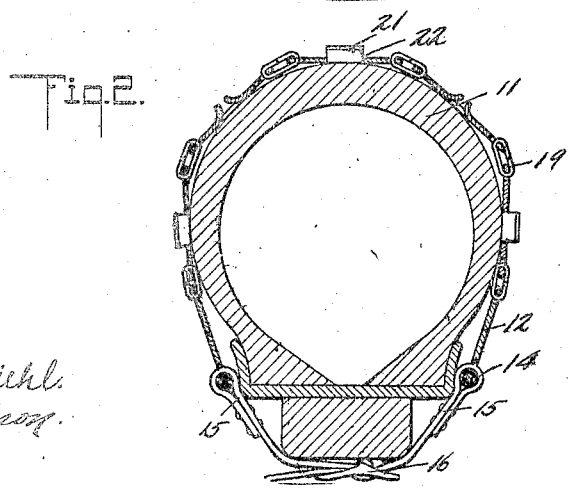

Aug. 17, 1926.
K. E. BLUM
1,596,796
ANTISKID DEVICE
Filed Jan. 27, 1926   2 Sheets-Sheet 2
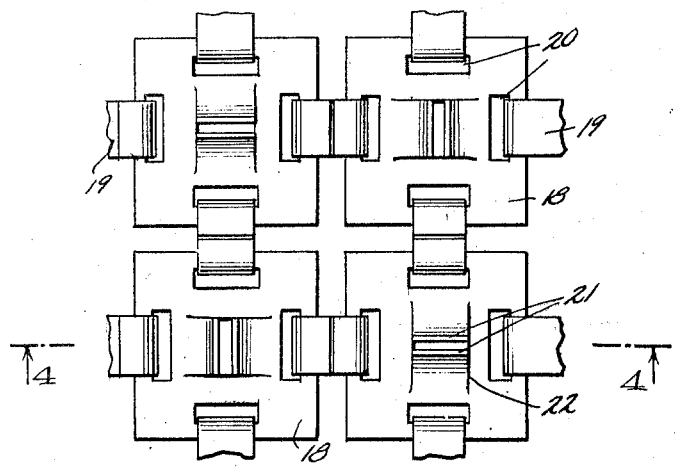
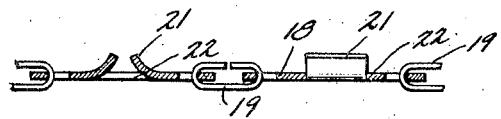
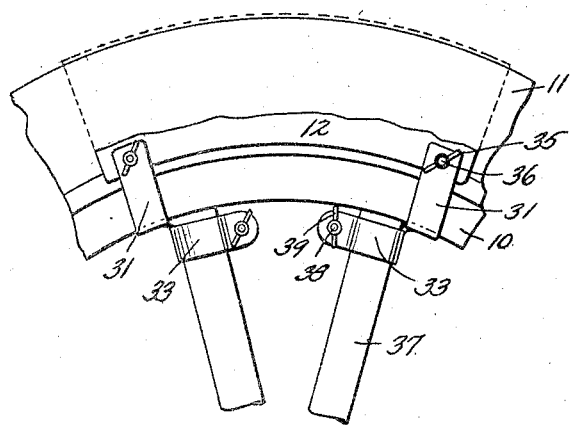
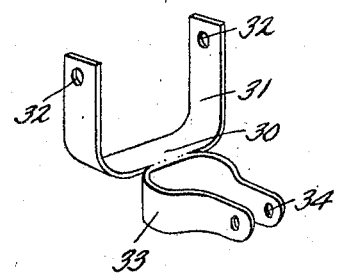
WITNESSES
INVENTOR
K. E. BLUM,
BY
ATTORNEYS Patented Aug. 17, 1926.

1,596,796

UNITED STATES PATENT OFFICE.

KATHARINE E. BLUM, OF NEW YORK, N. Y.

ANTISKID DEVICE.

Application filed January 27, 1926. Serial No. 84,260.

This invention relates to new and useful improvements in anti-skidding attachments for vehicle wheels, and it pertains more particularly to a device especially adapted for use on motor vehicle wheels in order to increase the traction thereof.

While the device illustrated in the present invention is capable of use on wet or snowy pavements, it is particularly intended for use when the pavements are coated or covered with a layer of ice.

Reference is had to the accompanying drawings in which—

Figure 1 is a side elevation of a vehicle wheel showing the invention attached thereto, one of the traction devices being shown in full lines and two traction devices being shown in dotted lines to disclose the relative positions of the devices;

Fig. 2 is a sectional view taken on the line 2—2 of Fig. 1;

Fig. 3 is a detail plan view on an enlarged scale showing the specific construction of the mesh employed;

Fig. 4 is a sectional view on the line 4—4 of Fig. 3;

Fig. 5 is a detail elevational view showing a modified form of attaching the members of the wheel;

Fig. 6 is a detail perspective view of the clip employed in the modified form.

Referring more particularly to the drawings, the reference character 10 designates a wheel, and 11 designates a pneumatic tire carried thereby. Mounted on each side of the tire and overlapping the felly of the wheel is a plate 12 and these plates 12 are curved to conform to the curvature of the wheel. Each of the plates 12 is provided with an eyelet or cut-out portion 13, and secured within said eyelet or cut-out portion 13 is a roller 14. Passing around each of these rollers 14 is a strap 15, one of which straps is provided with a buckle 16 for the reception of the other strap, to secure the plates in position on the wheel. It is to be understood that there are preferably one set of straps for each end of each of the antiskid elements.

Secured to each of the plates 12 and extending over the tread surface of the tire 11, is a mesh fabric, and said fabric consists of a plurality of plates 18 connected together by means of links 19. As shown in Fig. 3, each of these plates 18 comprises a substantially rectangular body portion provided on each of its sides near its respective edge, with an elongated slot or cut-out portion 20. These elongated slots or cut-out portions 20 form the means in which the ends of the links or loops 19 are retained to secure the several plates 18 in proper relation to each other. Each of these plates 18 is further provided at a central point with two outwardly disposed tongues or projecting portions 21, the plates being cut as at 22 in parallel slots in order that these tongues may be bent outwardly. These plates are secured together with the outwardly bent tongues 21 of one plate oppositely disposed with respect to the said tongues on each of the next adjacent plates, as best shown in Fig. 3, in such a manner that the outwardly projecting tongues 21 on one set of plates would extend circumferentially of the tire wall, whereas on each of the other plates these tongues would extend with their length transversely of the tread of the tire.

In the form of the invention shown in Figs. 5 and 6, the same type of mesh is employed, and it is secured to the side plates 12 in substantially the same manner as in the preferred form of the invention. In the embodiment shown in Figs. 5 and 6, however, clips 30 are employed for securing the side plates to the wheel, and these clips comprise a substantially U-shaped member 31, the legs of which are provided with perforations 32. Formed integral with the U-shaped member 31 is a second U-shaped member 33, which latter is positioned at right angles to the U-shaped member 31, and the legs of the U-shaped member 33 are provided with perforations 34. As shown in Fig. 5, the U-shaped members 31 are adapted to embrace the felly of the wheel 10, and are secured to the side plates 12 by means of a nut 35 and a bolt 36, which latter passes through the perforations 32 in the legs of the U-shaped member 31. The U-shaped members 33 are each adapted to embrace one of the spokes 37 of the wheel, and each member 33 is secured to its respective spoke by means of a bolt 38 and a nut 39, it being understood that the bolt 38 passes through the alined perforation 34 in the legs of the U-shaped member 33.

From the foregoing it will be seen that the present invention provides means by which the traction of a vehicle wheel may be greatly increased and that said means is also readily attachable to and detachable from the wheel.

What is claimed is:

An anti-skid armor for pneumatic tires comprising a plurality of individual sections adapted to be secured about the tread surface of the tire, each of said sections comprising a side plate conforming in shape to the shape of the wheel, a plurality of plates secured one to the other by links to form a fabric, links for securing side edges of said fabric to their respective plates, and gripping elements formed in each of said plates, said gripping elements being formed by slitting the plates and bending upwardly separate portions, said plates being so arranged in the fabric that the anti-skid element in each plate is arranged in opposite relation to the anti-skid element of the next adjacent plate on each side thereof.

KATHARINE E. BLUM.